United States Patent
Wu et al.

(10) Patent No.: US 12,462,795 B2
(45) Date of Patent: Nov. 4, 2025

(54) CONTEXTUAL FEATURE VECTORS FOR PROCESSING SPEECH

(71) Applicant: ASAPP, INC., New York, NY (US)

(72) Inventors: Felix Wu, Ithaca, NY (US);
Kwangyoun Kim, Santa Clara, CA (US); Jing Pan, San Jose, CA (US); Kyu Jeong Han, Pleasanton, CA (US); Kilian Quirin Weinberger, Ithaca, NY (US); Yoav Artzi, New York, NY (US)

(73) Assignee: ASAPP, INC., New York, NY (US)

( * ) Notice: Subject to any disclaimer, the term of this patent is extended or adjusted under 35 U.S.C. 154(b) by 439 days.

(21) Appl. No.: 17/493,716

(22) Filed: Oct. 4, 2021

(65) Prior Publication Data

US 2022/0383858 A1 Dec. 1, 2022

Related U.S. Application Data

(60) Provisional application No. 63/194,678, filed on May 28, 2021.

(51) Int. Cl.
*G10L 15/16* (2006.01)
*G10L 15/183* (2013.01)

(52) U.S. Cl.
CPC ............ *G10L 15/16* (2013.01); *G10L 15/183* (2013.01)

(58) Field of Classification Search
CPC ....... G10L 15/183; G10L 15/16; G10L 25/30; G10L 25/57; G10L 19/167; G10L 19/26;
(Continued)

(56) References Cited

U.S. PATENT DOCUMENTS 11,462,209 B2 * 10/2022 Arik .................... G10L 25/18
11,495,210 B2 * 11/2022 Li ....................... G10L 15/18
(Continued)

OTHER PUBLICATIONS

Abdel-Hamid, Ossama et al., "Applying convolutional neural networks concepts to hybrid nn-hmm model for speech recognition", 2012 IEEE international conference on Acoustics, speech and signal processing (ICASSP), 2012, pp. 4277-4280.
(Continued)

*Primary Examiner* — Abdelali Serrou
(74) *Attorney, Agent, or Firm* — GTC Law Group PC & Affiliates

(57) ABSTRACT

For any application that processes speech, improving the quality of the feature vectors may improve the quality of the speech application. The quality of feature vectors may be improved by modifying a neural network architecture for computing feature vectors to allocate computational resources where they are more effective for learning and computing the feature vectors. Contextual feature vectors may be computed from feature vectors by using a parameterized downsampling operation that decreases a vector sequence rate, processing the downsampled vectors with a neural network, and using a parameterized upsampling operation that increases a vector sequence rate. For example, parameterized downsampling may decrease a vector sequence rate by a factor of two, a neural may require fewer computational resources since it operates with a lower vector sequence rate, and parameterized upsampling may then increase the vector sequence rate by a factor of two.

18 Claims, 7 Drawing Sheets

(58) Field of Classification Search
CPC .............. G10L 19/0204; G10L 21/038; G10L 19/0208; G10L 19/24; G10L 19/0017; G10L 13/02; G10L 13/047; G10L 25/45; G10L 2013/105; G10L 15/02; G06F 18/25; G06F 18/214; G06F 1/163; G06F 18/2413; G06F 2203/012; G06F 3/011; G06F 3/0338; G06F 3/0346; G06F 3/04842; G06F 18/2115

See application file for complete search history.

(56) References Cited

U.S. PATENT DOCUMENTS

| | | | | |
|---|---|---|---|---|
| 11,862,146 | B2* | 1/2024 | Han | G10L 15/16 |
| 11,908,461 | B2* | 2/2024 | Hu | G10L 15/063 |
| 11,985,179 | B1* | 5/2024 | Tacer | G10L 21/00 |
| 12,100,386 | B2* | 9/2024 | Gao | G06F 40/58 |
| 2021/0050021 | A1* | 2/2021 | Okabe | G06N 3/045 |
| 2021/0089909 | A1* | 3/2021 | Binkowski | G10L 13/047 |
| 2021/0118426 | A1* | 4/2021 | Li | G10L 15/04 |
| 2021/0193157 | A1* | 6/2021 | Craven | G10L 19/022 |
| 2021/0232753 | A1* | 7/2021 | He | G06F 40/151 |
| 2021/0294840 | A1* | 9/2021 | Lee | G06N 3/084 |
| 2022/0114424 | A1* | 4/2022 | Quader | G06V 10/454 |
| 2022/0189454 | A1* | 6/2022 | Huang | G10L 13/047 |
| 2022/0327316 | A1* | 10/2022 | Grauman | G06N 3/0464 |
| 2022/0343895 | A1* | 10/2022 | Tomar | G10L 15/16 |

OTHER PUBLICATIONS

Amodei, Dario et al., "Deep speech 2: End-to-end speech recognition in english and mandarin", International conference on machine learning, PMLR, 2016, pp. 173-182.

Baevski, Alexei et al., "Effectiveness of self-supervised pre-training for speech recognition", arXiv:1911.03912v3 [cs.CL], https://arxiv.org/pdf/1911.03912.pdf (accessed on Oct. 4, 2021), May 18, 2020, 8 pages.

Baevski, Alexei et al., "vq-wav2vec: Self-Supervised Learning of Discrete Speech Representations", arXiv:1910.05453v3 [cs.CL], https://arxiv.org/pdf/1910.05453.pdf (accessed on Oct. 4, 2021), Feb. 16, 2020, 12 pages.

Baevski, Alexei et al., "wav2vec 2.0: A Framework for Self-Supervised Learning of Speech Representations", arXiv:2006.11477v3 [cs.CL], https://arxiv.org/pdf/2006.11477.pdf (accessed on Oct. 4, 2021), Oct. 22, 2020, 19 pages.

Chan, William et al., "Listen, Attend and Spell: A neural network for large vocabulary conversational speech recognition", International Conference on Acoustics, Speech, and Signal Processing / arXiv:1508.01211v2 [cs.CL], 2016, pp. 4960-4964.

Chen, Ting et al., "A simple framework for contrastive learning of visual representations", ArXiv, abs/2002.05709v3 [cs.LG], Jul. 1, 2020, 20 pages.

Chuang, Yung-Sung et al., "Speechbert: An audio-and-text jointly learned language model for end-to-end spoken question answering", arXiv:1910.11559v4 [cs.CL], Aug. 11, 2020, 6 pages.

Chung, Yu-An et al., "Unsupervised cross-modal alignment of speech and text embedding spaces", arXiv preprint arXiv:1805.07467v2 [cs.CL], Sep. 20, 2018, 11 pages.

Collobert, Ronan et al., "Wav2letter: an end-to-end convnet-based speech recognition system", ArXiv, abs/1609.03193v2 [cs.LG], Sep. 13, 2016, 8 pages.

Conneau, Alexis et al., "Unsupervised cross-lingual representation learning for speech recognition", ArXiv, abs/2006.13979v2 [cs.CL], Dec. 15, 2020, 12 pages.

Devlin, J. et al., "Bert: Pre-training of deep bidirectional transformers for language understanding", Proceedings of NAACL-HLT 2019, Minneapolis, Minnesota, Jun. 2-Jun. 7, 2019, pp. 4171-4186.

Devlin, Jacob et al., "BERT: Pre-training of deep bidirectional Transformers for language understanding", arXiv, https://arxiv.org/abs/1810.04805v2 [cs.CL], May 24, 2019, 16 pages.

Dollár, Piotr et al., "Fast and accurate model scaling", ArXiv, arXiv:2103.06877v1 [cs.CV], Mar. 11, 2021, 10 pages.

Dong, Linhao et al., "Speech-transformer: a no-recurrence sequence-to-sequence model for speech recognition", 2018 IEEE International Conference on Acoustics, Speech and Signal Processing (ICASSP), 2018, pp. 5884-5888.

Fan, Angela et al., "Reducing transformer depth on demand with structured dropout", ArXiv, abs/1909.11556v1 [cs.LG], Sep. 25, 2019, 15 pages.

Gong, Yuan et al., "Psla: Improving audio event classification with pretraining, sampling, labeling, and aggregation", arXiv preprint arXiv:2102.01243v3 [cs.SD], Nov. 17, 2021, 15 pages.

Goyal, Priya et al., "Accurate, Large Minibatch SGD: Training ImageNet in 1 Hour", arXiv:1706.02677v1 [cs.CV], Jun. 8, 2017, 12 pages.

Graves, Alex et al., "Connectionist Temporal Classification: Labelling Unsegmented Sequence Data with Recurrent Neural Networks", Proceedings of the 23rd International Conference on Machine Learning (ICML 2006), Pittsburgh, PA, Jun. 25-29, 2006, 8 pages.

Graves, Alex, "Sequence Transduction with Recurrent Neural Networks", arXiv:1211.3711v1 [cs.NE], https://arxiv.org/pdf/1211.3711.pdf, Nov. 14, 2012, 9 pages.

Graves, Alex et al., "Speech recognition with deep recurrent neural networks", 2013 IEEE international conference on acoustics, speech and signal processing / arXiv:1303.5778v1 [cs.NE], 2013, pp. 6645-6649.

Grill, Jean-Bastien et al., "Bootstrap your own latent: A new approach to self-supervised learning", arXiv preprint arXiv:2006.07733v3 [cs.LG], Sep. 10, 2020, 35 pages.

Gulati, Anmol et al., "Conformer: Convolution-augmented Transformer for Speech Recognition", arXiv: 2005.08100v1 [eess.AS], https://arxiv.org/pdf/2005.08100.pdf, May 16, 2020, 5 pages.

Gumbel, Emil J. et al., "Statistical theory of extreme values and some practical applications: a series of lectures, vol. 33", US Government Printing Office, Feb. 12, 1954, 60 pages.

Han, Wei et al., "ContextNet: Improving convolutional neural networks for automatic speech recognition with global context", arXiv:2005.03191v3 [eess.AS], https://arxiv.org/pdf/2005.03191.pdf, May 16, 2020, 5 pages.

He, Kaiming et al., "Momentum contrast for unsupervised visual representation learning", arXiv:1911.05722v3[ cs.CV], Mar. 23, 2020, 12 pages.

He, Pengcheng et al., "Deberta: Decoding-enhanced bert with disentangled attention", arXiv:2006.03654v6 [cs.CL], Oct. 6, 2021, 23 pages.

Hernandez, François et al., "Ted-lium 3: twice as much data and corpus repartition for experiments on speaker adaptation", arXiv:1805.04699v4 [cs.CL], Jun. 13, 2019, 11 pages.

Hinton, Geoffrey et al., "Deep neural networks for acoustic modeling in speech recognition: The shared views of four research groups", IEEE Signal processing magazine, 29(6), Nov. 2012, pp. 82-97.

Hsu, Wei-Ning et al., "Hubert: How much can a bad teacher benefit asr pre-training", Neural Information Processing Systems Workshop on Self-Supervised Learning for Speech and Audio Processing Workshop / arXiv:2106.07447v1 [cs.CL], Jun. 14, 2021, 10 pages.

Hsu, Wei-Ning et al., "Robust wav2vec 2.0: Analyzing domain shift in self-supervised pre-training", ArXiv, abs/2104.01027v2 [cs.SD], Sep. 8, 2021, 9 pages.

Huang, Gao et al., "Deep networks with stochastic depth", ECCV / arXiv:1603.09382v3 [cs.LG], Jul. 28, 2016, 16 pages.

Ioffe, Sergey et al., "Batch normalization: Accelerating deep network training by reducing internal covariate shift", International Conference on Machine Learning, 2015, pp. 448-456.

Jang, Eric et al., "Categorical reparameterization with gumbel-softmax", arXiv:1611.01144v5 [stat.ML], Aug. 5, 2017, 13 pages.

Kingma, Diederik P. et al., "Adam: A Method for Stochastic Optimization", International Conference on Learning Representations, 2015 (ICLR 2015), arXiv:1412.6980v9 [cs.LG] Jan. 30, 2017, https://arxiv.org/pdf/1412.6980.pdf (accessed Feb. 8, 2021), 2015, 15 pages.

(56) References Cited

OTHER PUBLICATIONS

Liu, Yinhan et al., "RoBERTa: A robustly optimized BERT pretraining approach", arXiv:1907.11692v1 [cs.CL], Jul. 26, 2019, 13 pages.

Maddison, Chris J. et al., "A* sampling", arXiv:1411.0030v2 [stat.CO], Jan. 26, 2015, 19 pages.

Niizumi, Daisuke et al., "Byol for audio: Self-supervised learning for general-purpose audio representation", arXiv:2103.06695v2 [eess.AS], Apr. 21, 2021, 8 pages.

Ott, Myle et al., "Fairseq: A Fast, Extensible Toolkit for Sequence Modeling", Proceedings of NAACL-HLT 2019: Demonstration, arXiv:1904.01038v1 [cs.CL], http://128.84.21.203/pdf/1904.01038, Apr. 1, 2019, 6 pages.

Panayotov, Vassil et al., "Librispeech: An ASR Corpus Based on Public Domain Audio Books", 2015 IEEE International Conference on Acoustics, Speech and Signal Processing (ICASSP), 2015, pp. 5206-5210.

Paszke, Adam et al., "PyTorch: An Imperative Style, High-Performance Deep Learning Library", Advances in Neural Information Processing Systems 32, 33rd Conference on Neural Information Processing Systems (NeurIPS 2019), Vancouver, Canada, https://proceedings.neurips.cc/paper/2019/file/bdbca288fee7f92f2bfa9f7012727740-Paper.pdf, 2019, 12 pages.

Pepino, Leonardo et al., "Emotion recognition from speech using wav2vec 2.0 embeddings", arXiv:2104.03502v1 [cs.SD], Apr. 8, 2021, 5 pages.

Saeed, Aaqib et al., "Contrastive learning of general-purpose audio representations", ICASSP 2021-2021 IEEE International Conference on Acoustics, Speech and Signal Processing (ICASSP) / arXiv:2010.10915v1 [cs.SD], 2021, pp. 3875-3879.

Schneider, Steffen et al., "wav2vec: Unsupervised pre-training for speech recognition", Interspeech, arXiv:1904.05862v4 [cs.CL], Sep. 11, 2019, 9 pages.

Shaw, Peter et al., "Self-attention with relative position representations", NAACL-HLT / arXiv:1803.02155v2 [cs.CL], Apr. 12, 2018, 5 pages.

Song, Xingchen et al., "Speech-xlnet: Unsupervised acoustic model pretraining for self-attention networks", arXiv: 1910.10387v2 [cs.CL], May 22, 2020, 5 pages.

Synnaeve, Gabriel et al., "A temporal coherence loss function for learning unsupervised acoustic embeddings", Procedia Computer Science, 81, 5th Workshop on Spoken Language Technology for Under-resourced Languages, SLTU 2016, May 9-12, 2016, Yogyakarta, Indonesia, 2016, pp. 95-100.

Tan, Mingxing et al., "Efficientnet: Rethinking model scaling for convolutional neural networks", arXiv:1905.11946v5 [cs.LG], Sep. 11, 2020, 11 pages.

Van Den Oord, Aaron et al., "Representation learning with contrastive predictive coding", arXiv:1807.03748v2 [cs.LG], Jan. 22, 2019, 13 pages.

Vaswani, Ashish et al., "Attention is all you need", arXiv preprint arXiv:1706.03762v4 [cs.CL], Jun. 30, 2017, 15 pages.

Viterbi, Andrew J., "Error bounds for convolutional codes and an asymptotically optimum decoding algorithm", IEEE Trans. Inf. Theory, vol. IT-13, No. 2, 1967, pp. 260-269.

Wang, Changhan et al., "Large-scale self and semi-supervised learning for speech translation", arXiv:2104.06678v1 [cs.CL], Apr. 14, 2021, 5 pages.

Wang, Changhan et al., "Voxpopuli: A large-scale multilingual speech corpus for representation learning, semi-supervised learning and interpretation", arXiv:2101.00390v2 [cs.CL], Jul. 27, 2021, 11 pages.

Wang, Luyu et al., "Multimodal self-supervised learning of general audio representations", arXiv:2104.12807v2 [cs.SD], Apr. 28, 2021, 6 pages.

Watanabe, Shinji et al., "ESPnet: End-to-End Speech Processing Toolkit", arXiv:1804.00015v1 [cs.CL], https://arxiv.org/pdf/1804.00015.pdf, Mar. 30, 2018, 5 pages.

Xu, Qiantong et al., "Self-training and pre-training are complementary for speech recognition", arXiv:2010.11430v1 [cs.LG], Oct. 22, 2020, 8 pages.

Yang, Daniel, "A deeper look at sheet music composer classification using self-supervised pretraining", Applied Sciences, 11(4):1387, 2021, 16 pages.

Yeh, Ching-Feng et al., "Transformer-Transducer: End-to-End Speech Recognition with Self-Attention", arXiv:1910.12977v1 [eess.AS], https://arxiv.org/pdf/1910.12977.pdf, Oct. 28, 2019, 5 pages.

Zhang, Qian et al., "Transformer transducer: a Streamable Speech Recognition Model with Transformer Encoders and RNN-T loss", arXiv:2002.02562v2 [eess.AS], https://arxiv.org/pdf/2002.02562.pdf, final version of the paper submitted to IEEE International Conference on Acoustics, Speech and Signal Processing (ICASSP) 2020 on Oct. 21, 2019, Feb. 14, 2020, pp. 7829-7833.

Zhang, Yu et al., "Pushing the Limits of Semi-Supervised Learning for Automatic Speech Recognition", arXiv:2010.10504v1 [eess.AS], https://arxiv.org/pdf/2010.10504.pdf, Oct. 20, 2020,, 11 pages.

Zhao, Yilun et al., "Musicoder: A universal music-acoustic encoder based on transformer", International Conference on Multimedia Modeling, Springer / arXiv:2008.00781v2 [eess.AS], 2021, pp. 417-429.

* cited by examiner

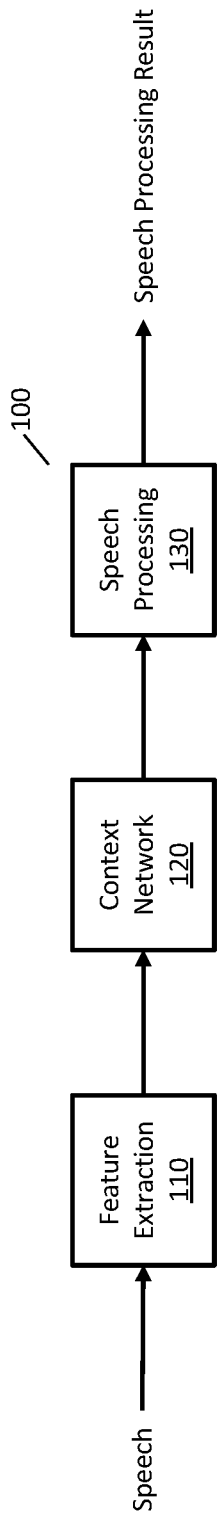
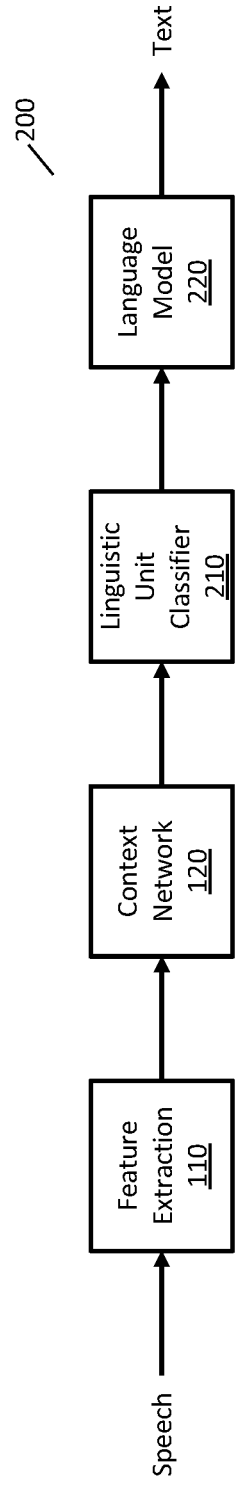
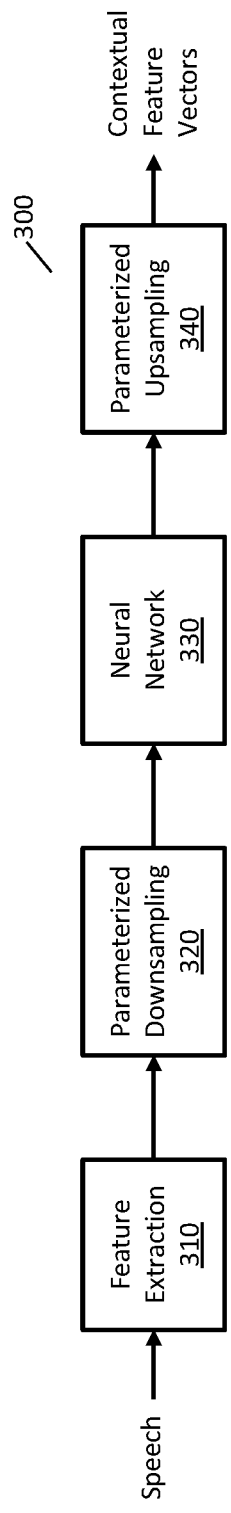
Fig. 1
Fig. 2
Fig. 3

CONTEXTUAL FEATURE VECTORS FOR PROCESSING SPEECH

CLAIM OF PRIORITY

This patent application claims the benefit of U.S. Patent Application Ser. No. 63/194,678, filed May 28, 2021, and entitled "PERFORMANCE-EFFICIENCY TRADE-OFFS IN UNSUPERVISED PRE-TRAINING FOR SPEECH RECOGNITION" (ASAP-0038-P01).

The content of the foregoing application is hereby incorporated by reference in its entirety for all purposes.

BACKGROUND

A variety of applications may process a speech signal. For example, applications that process speech may include speech recognition (e.g., converting speech to text), speaker verification, speaker identification, and sentiment analysis. In performing speech processing, feature vectors may be obtained from an audio signal, and the feature vectors may then be processed to accomplish the desired objective. For example, for a speech recognition application, the feature vectors may be processed to determine text corresponding to the speech.

The quality of the feature vectors may impact the performance of the speech processing application, such as the accuracy of a speech recognition application. Other factors to consider when computing feature vectors are processing time or resources to compute the feature vectors from an audio signal and training time to train models used to compute the feature vectors.

BRIEF DESCRIPTION OF THE FIGURES

The invention and the following detailed description of certain embodiments thereof may be understood by reference to the following figures:

FIG. 1 is an example system for computing feature vectors in a speech processing application.

FIG. 2 is an example system for computing feature vectors in a speech recognition application.

FIG. 3 is an example system for computing contextual feature vectors using parameterized downsampling and parameterized upsampling.

DETAILED DESCRIPTION

Figure 4:
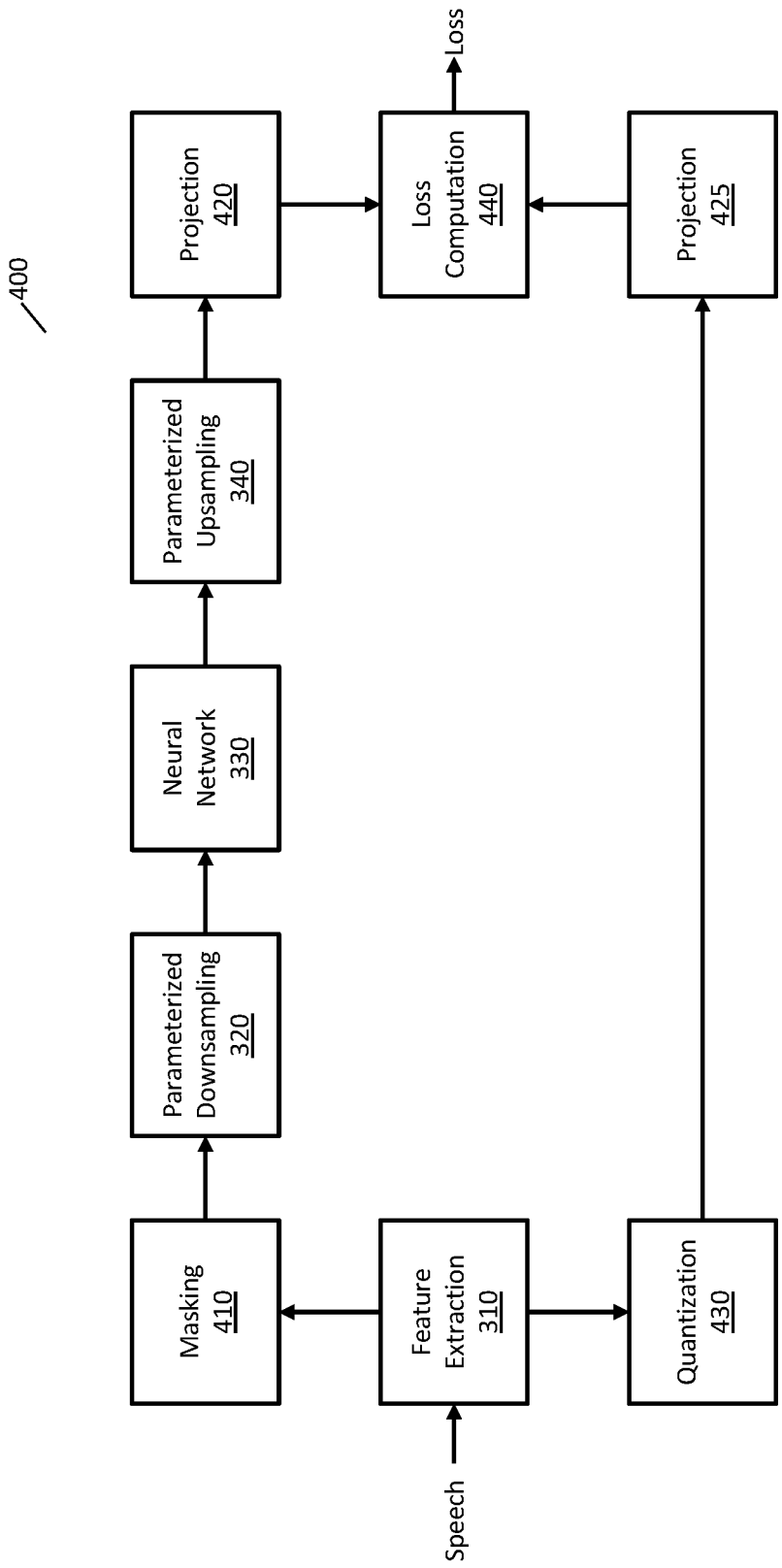
FIG. 4 is an example system for pre-training parameters of mathematical models for computing feature vectors.

Speech processing applications may include processing an audio signal (e.g., digital samples of a speech signal obtained from a microphone) to compute a sequence of feature vectors that represent the speech signal. Example feature vectors include mel-frequency cepstral coefficients (MFCC features) and perceptual linear prediction features (PLP features). These features may then be used for subsequent processing, such as for recognizing phonemes or words in the speech.

Described herein are improved techniques for computing feature vectors that may be used in a speech processing application. The feature vectors described herein may improve the performance of a speech processing application and may also reduce the time or required resources for computing feature vectors or training mathematical models used to compute feature vectors. Speech processing applications that compute contextual feature vectors using techniques described herein will provide numerous benefits to the entity or company that provides the speech processing application and also to end users of the speech processing application.

The techniques described herein allow a company providing a speech processing application to lower its costs in developing the speech processing application and also in deploying the speech processing application. Reducing required resources required for developing a speech processing application (e.g., the number and size of compute instances) allows the company to reduce development time, use fewer compute resources, and reduce employee time. Reducing required resources for deployment of a speech processing application allows the company to provide the services to customers at lower cost.

The techniques described herein allow a company providing a speech processing application to increase its revenue from the speech processing application. Increasing the performance of the speech processing application allows the company to charge higher prices for the higher quality services. In addition, the higher performance of the speech processing application may increase demand or increase the number of applications for which it is suitable (e.g., allowing speech recognition in noisy environments, such as in a car).

The techniques described herein also allow end users to access speech processing applications at lower cost (since the production and development costs of the company are lower and may be passed on to end users) or to access higher performing speech processing speech applications.

The techniques described herein include improvements to techniques known to one of skill in the art as Wav2Vec (see Alexei Baevski, Michael Auli, and Abdelrahman Mohamed, *Effectiveness of self-supervised pre-training for speech recognition*, ArXiv, abs/1911.03912, 2019.); VQ-Wav2Vec (see Alexei Baevski, Steffen Schneider, and Michael Auli, *vq-wav2vec: Self-supervised learning of discrete speech representations*, ArXiv, abs/1910.05453, 2020.); and Wav2Vec 2.0 (see Alexei Baevski, Henry Zhou, Abdelrahman Mohamed, and Michael Auli, *wav2vec 2.0: A framework for self-supervised learning of speech representations*, arXiv preprint arXiv: 2006.11477, 2020.). These three references are collectively referred to herein as the Wav2Vec references.

FIG. 1 is an example system 100 for computing feature vectors in a speech processing application. In FIG. 1, feature extraction component 110 processes a speech signal to compute a sequence of feature vectors. Any appropriate speech signal may be processed, such as a sequence of digital samples of an analog audio signal at a sampling rate of 16 kHz and quantized to 16 bits. The output of feature extraction component 110 may be a sequence of feature vectors with a vector sequence rate that is less than the sampling rate of the audio signal. For example, the feature vectors may have a length of 128 and a rate of 50 Hz. Feature extraction component 110 may be implemented using any appropriate techniques. In some implementations, feature extraction component 110 may be implemented using a convolutional neural network, such as described in the Wav2Vec references.

Context network component 120 may process the sequence of feature vectors computed by feature extraction component 110 and compute another sequence of feature vectors that include contextual information. The output of context network component 120 may be referred to as contextual feature vectors, enhanced feature vectors, or contextual embedding vectors. The length and vector sequence rate of the contextual feature vectors computed by context network component 120 may be the same or may be different from the length and rate of the feature vectors computed by feature extraction component 110. Context network component 120 may be implemented using any appropriate techniques such as a combination of a convolutional neural network and a transformer neural network or any of the techniques described in the Wav2Vec references.

Speech processing component 130 processes the sequence of contextual feature vectors to determine a speech processing result. Speech processing component 130 may implement any appropriate speech application using any appropriate techniques. For example, speech processing component 130 may include any of the following: a speech recognition application that processes the sequence of contextual feature vectors to determine phonemes, graphemes, or text corresponding to speech; a speaker verification application that processes the sequence of contextual feature vectors to determine if the speech corresponds to a specific person; a speaker identification application that processes the sequence of contextual feature vectors to identify the person who is speaking; or a sentiment application that determines a sentiment of the person speaking.

In system 100, the output of feature extraction component 110 and context network component 120 may be referred to as feature vectors in that each includes vectors that represent the speech signal and may be used for a speech processing application. A difference between the feature vectors from the feature extraction component and the feature vectors from the context network component is the context or the amount of information from other portions of the speech signal that are used in computing the feature vectors.

In computing feature vectors, feature extraction component 110 may use a relatively small portion of the speech signal, such as 25 milliseconds of the speech signal. Each feature vector in the sequence may represent 25 milliseconds of the signal spaced 20 milliseconds apart (so that consecutive feature vectors use overlapping portions of the speech signal).

In computing the contextual feature vectors, context network component 120 may use information from multiple feature vectors to compute a single contextual feature vector. Accordingly, a single contextual feature vector may include information relating to a larger portion of the speech signal.

Because the contextual feature vectors include information from a longer period of time, they may be more informative than feature vectors without the context information. For example, some sounds in speech are difficult to distinguish such as the sound of the letter "s" and the sound of the letter "f". The feature vectors of feature extraction component 110 may produce similar feature vectors for these two sounds and the feature vectors may be less useful for a speech recognition application. The contextual feature vectors contain information from a longer span of time and may thus include more information to more clearly distinguish feature vectors for the letter "s" and feature vectors for the letter "f".

FIG. 2 is an example system 200 for computing feature vectors in a speech recognition application. In FIG. 2, feature extraction component 110 and context network component 120 may be implemented as described in FIG. 1.

Linguistic unit classifier 210 may then process the sequence of contextual feature vectors to determine probabilities or likelihoods for a sequence of linguistic units corresponding to the speech. Any appropriate linguistic units may be used, such as phonemes (e.g., triphones, quinphones, or diphones), syllables, or graphemes. Linguistic unit classifier 210 may be implemented using any appropriate techniques, such as a neural network classifier.

Language model 220 may then process the sequence of linguistic units to determine the text of the speech. Language model 220 may be implemented using any appropriate techniques. For example, language model 220 may be implemented using a beam search and a neural network that determines probabilities for sequences of linguistic units.

The performance of the above speech processing systems may be improved by changing the allocation of computational resources. Certain portions of the above systems, such as a transformer neural network, may require significant computational resources. Modifying the architecture to reduce certain computational resources (such as by downsampling to reduce an input vector sequence rate) may allow for the allocation of increased resources in other aspects (such as increasing a number of neural network layers or a size of the neural network layers). Improved allocation of computational resources may result in improved performance and/or faster implementations of a speech processing application.

FIG. 3 is an example system 300 for computing contextual feature vectors using parameterized downsampling and parameterized upsampling.

In FIG. 3, feature extraction component 310 may process a speech signal to compute a first sequence of vectors. Feature extraction component 310 may use any of the techniques described above for feature extraction component 110, such as a convolutional neural network. Feature extraction component 310 may also use any of the techniques described in greater detail below. In some implementations, the first sequence of vectors may have a rate of 50 kHz and the vectors may have dimension 512.

Parameterized downsampling component 320 may process the first sequence of vectors computed by feature extraction component 310 and output a second sequence of vectors with a lower vector sequence rate. For example, the sequence rate of the second sequence of vectors may be one half of the sequence rate of the first sequence of vectors. Parameterized downsampling component 320 may be implemented using any appropriate techniques to compute a second sequence of vectors from a first sequence of vectors where the rate of the second sequence of vectors is lower than the rate of the first sequence of vectors.

In some implementations, parameterized downsampling component 320 may be implemented using one or more neural network layers, such as any of the following layers: (i) a convolutional neural network layer with a stride greater than one or (ii) a pooling neural network layer (e.g., a max, min, or average pooling layer). The neural network layers may be implemented using any combination of sequential and/or parallel layers. For example, parameterized downsampling component 320 may be implemented as a sum of the outputs of a pooling layer in parallel with a strided convolutional layer where the pooling layer has a kernel size of 2 and a stride size of 2 and the strided convolutional layer has a kernel size of 31, a stride of 2, and a number of channels that is equal to the dimension of the input sequence of vectors.

Neural network component 330 may process the second sequence of vectors computed by parameterized downsampling component 320 and output a third sequence of vectors. The vector sequence rate of the third sequence of vectors may be the same as or different from the rate of the second sequence of vectors. Neural network component 330 may be implemented with any appropriate neural network, such as a transformer neural network. In some implementations, the computational requirements of neural network component 330 may be significantly larger than other components of system 300, such that processing an input sequence of vectors with a lower sequence rate may significantly reduce the overall computational requirements of system 300.

In some implementations, neural network component 330 may be implemented with a plurality of feed-forward neural network layers and a plurality of self-attention neural network layers. For example, neural network component 330 may have 12-24 layers, a width of 256-512, 4-8 attention heads, layer normalization, and ReLU (rectified linear unit) or GELU (Gaussian error linear unit) activation functions.

In some implementations, neural network component 330 may be implemented with a transformer neural network that includes a disentangled attention neural network layer. With disentangled attention, the words (or tokens) of the input may be represented with two vectors instead of a single vector. The two vectors may represent the content of the word (what the word is) and the relative position of the word in the input. A cross attention weight for any two words in the input may then be computed using content vectors for the two words and the relative position vectors for the two words and disentangled matrices. The cross attention weight may be computed, for example, as a combination of four attention scores, where each of the four attention scores to combinations of content and relative position.

Parameterized upsampling component 340 may process the third sequence of vectors computed by neural network component 330 and output a fourth sequence of feature vectors with a higher vector sequence rate than the sequence rate of the third sequence of vecotors. The rate of the fourth sequence of vectors may be the same as or different from the rate of the first sequence of vectors. For example, the sequence rate of the fourth sequence of vectors may be twice that of the sequence rate of the third sequence of vectors. Parameterized upsampling component 340 may be implemented using any appropriate techniques to compute a fourth sequence of vectors from a third sequence of vectors where the rate of the fourth sequence of vectors is higher than the rate of the third sequence of vectors. In some implementations, parameterized upsampling component 340 may be implemented using one or more neural network layers, such as any of the following layers: (i) a transposed convolutional neural network layer (e.g., with a stride greater than one), (ii) an interpolation layer (e.g., linear or cubic interpolation), (iii) an average unpooling layer, or (iv) a linear neural network layer followed by a reshaping operation. For example, parameterized upsampling component 340 may be implemented with a transposed convolutional layer with a kernel size and stride of 2 and a number of channels that is equal to the dimension of the input sequence of vectors.

The output of parameterized upsampling component 340 is a sequence of feature vectors that may be used for any appropriate speech processing application. In some implementations, the output of parameterized upsampling component 340 may be referred to as a sequence of contextual feature vectors or a sequence of enhanced feature vectors.

Other variations of FIG. 3 are possible. In some implementations, additional components or processing may be added between the components of FIG. 3. For example, the additional processing may include additional neural network layers, normalization, or non-linear processing.

In some implementations, the allocation of computational resources in feature extraction component 310 may also be modified to improve the performance of a speech processing application.

In some implementations, feature extraction component 310 may be implemented using one or more convolutional neural network (CNN) layers. For example, feature extraction component 310 may include 7 CNN layers with the following configuration for the layers:
Channels: 512, 512, 512, 512, 512, 512, 512
Kernel sizes: 7, 3, 3, 3, 3, 2, 2
Strides: 5, 2, 2, 2, 2, 2, 2

With this configuration, the earlier layers will require greater computational time or resources because the rate of processing is higher (the rate decreases with each strided layer) and because the layers all have the same number of channels.

To more evenly distribute the computational requirements of the CNN layers, the number of channels may be decreased for earlier layers and increased for later layers. For example, the number of channels may be changed to the following configuration:
Channels: 128, 256, 256, 512, 512, 1024, 1024

As the layers progress, the channel size increases (which increases computations) and the strides of the layers reduce the data rate (which decreases computations). A larger number of channels and a larger kernel size require greater computations, and a smaller number of channels and a smaller kernel size require less computations. Accordingly, decreasing the number of channels for earlier layers serves to more evenly distribute the computations across the layers.

Experimental results show that computing feature vectors by more evenly distributing the computations across layers in this manner improves the performance of a speech processing application relative to the required computational resources. For example, improved performance may be obtained with similar computational resources or similar performance may be obtained with fewer computational resources.

Computing feature vectors as described above may improve the performance of a production speech processing application. Reducing the computational requirements of computing feature vectors for a production speech processing application may allow for higher performance (e.g., through the use of larger mathematical models) or faster results that may provide an improved experience for users of the speech processing application. Reducing the computational requirements of computing feature vectors may also reduce the time needed to train mathematical models for computing the feature vectors, which may allow for more experimentation in the design or training of mathematical models or the use of larger mathematical models that may improve performance.

Now described are example techniques for training mathematical models used for computing the feature vectors described herein. The training of mathematical models may include pre-training (e.g., unsupervised training) and/or fine tuning of mathematical models (e.g., supervised training).

FIG. 4 is an example system 400 for pre-training parameters of mathematical models for computing feature vectors. In FIG. 4, feature extraction component 310, parameterized downsampling component 320, neural network component 330, and parameterized upsampling component 340 may be implemented using any of the techniques described herein. Each of these components includes parameters that may be determined by the training process.

In some implementations, the parameters of the components may be learned using unsupervised pre-training. The training data may include a large amount of audio data of speech where the text corresponding to the speech is not known. This is in contrast to supervised training where the text (or other labels) corresponding to the speech data is known. With unsupervised pre-training, mathematical models may be trained to produce feature vectors for a speech processing application (e.g., speech recognition) even though the portions of speech represented by the feature vectors may not be known.

During the training process, a speech signal may be processed using two different techniques to produce two different representations of the speech signal, and the parameters of the mathematical models may be updated so that the two representations are similar to each other. The two different processing techniques are shown in FIG. 4.

A first step that is common to both processing techniques is to compute a sequence of feature vectors from the speech signal using feature extraction component 310. This sequence of feature vectors is then input to the two processing techniques.

With the first processing technique, the sequence of feature vectors is processed by masking component 410 to mask out a portion of the feature vectors and produce a sequence of masked feature vectors. For example, some of the feature vectors may be modified to have values of 0.

The sequence of masked feature vectors is then processed by parameterized downsampling component 320, neural network component 330, and parameterized upsampling component 340 as described above to compute a sequence of contextual feature vectors.

The sequence of contextual feature vectors is then processed by projection component 420 to create a first sequence of projected feature vectors. Any appropriate projection may be applied that reduces the dimensionality of the contextual feature vectors. In some implementations, projection component 420 may be implemented using a linear projection (e.g., a matrix-vector multiplication performed on each contextual feature vector). Instead of using a linear projection, however, improved results may be obtained by performing the projection using a multi-layer perceptron (MLP), such as a 2-layer MLP. Although the MLP may have additional parameters and require additional computational resources for training, projection component 420 may not be needed when computing feature vectors for a production speech recognition application (see, e.g., FIGS. 1 and 3), and accordingly may not increase the computation requirements of a production system.

With the second processing technique, the sequence of feature vectors computed by feature extraction component 310 are quantized by quantization component 430 to compute a sequence of quantized feature vectors. Any appropriate quantization techniques may be used, such as those described in the Wav2Vec references. In some implementations, quantization component 430 may be implemented using Gumbel softmax or k-means clustering as are known to one of skill in the art.

The sequence of quantized feature vectors is then processed by projection component 425 to compute a second sequence of projected feature vectors. Any appropriate projection may be applied that reduces the dimensionality of the quantized feature vectors. Projection component 425 may be implemented using any of the techniques described above for projection component 420. Projection component 425 may have different parameters than projection component 420 so that the projection is adapted to the quantized feature vectors and is different from the projection performed by projection component 420.

In some implementations, the second processing technique may be performed without quantization component 430. Instead, projection component 425 may process the sequence of feature vectors as computed by feature extraction component 310.

Loss computation component 440 then processes the first sequence of projected feature vectors computed by projection component 420 and the second sequence of projected vectors computed by projection component 425 to compute a loss value for each feature vector. Loss computation component 440 may compute a loss value using any appropriate techniques. In some implementations, loss computation component 440 may compute a loss value as a weighted combination of a contrastive loss and a diversity loss as described in the Wav2Vec references.

The loss values computed by loss computation component 440 may then be used as part of a training process to update parameters of the mathematical models in FIG. 4, such as the parameters of feature extraction component 310, parameterized downsampling component 320, neural network component 330, and parameterized upsampling component 340. Any appropriate training and regularization techniques (e.g., dropout) may be used. In some implementations, the training process may include performing a forward pass to compute losses as described in FIG. 4, and back propagation may be performed with stochastic gradient descent to update the model parameters. The training process may be performed iteratively over a corpus of training data until the model parameters have converged.

Figure 5:
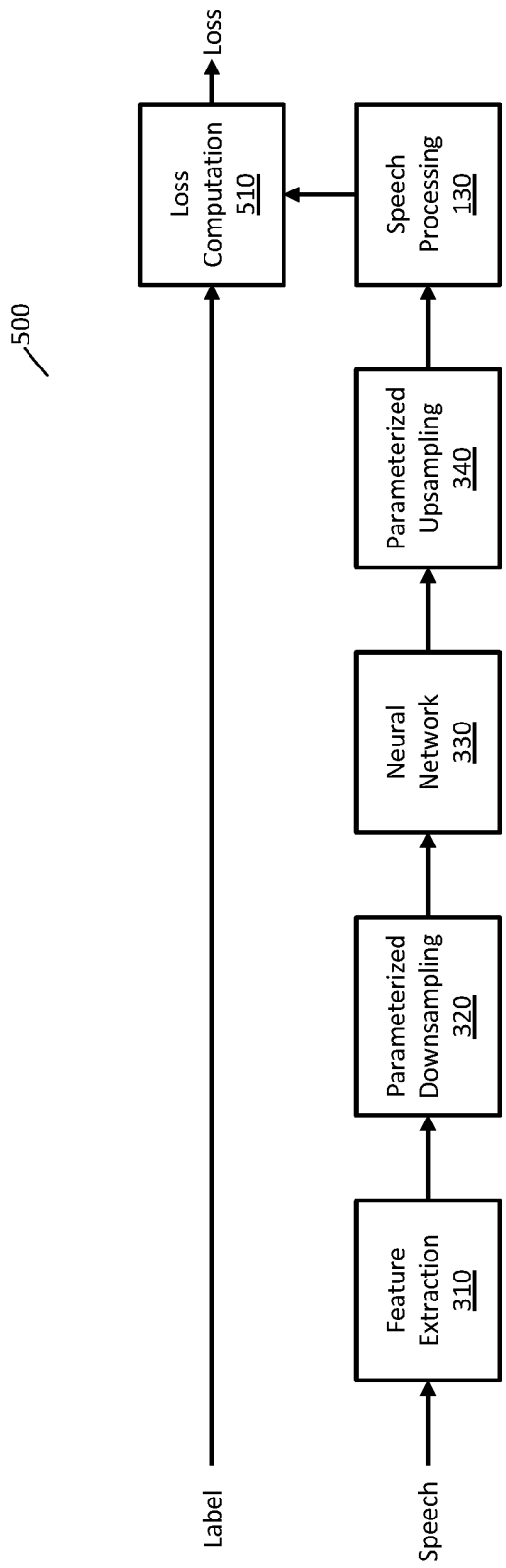
FIG. 5 is an example system for fine tuning parameters of mathematical models for computing feature vectors.

FIG. 5 is an example system 500 for fine tuning parameters of mathematical models for computing feature vectors. In some implementations, fine tuning may be implemented using supervised training. With supervised training, the training data may be associated with labels indicating a correct or truth value corresponding to the training data. For example, for a speech recognition application, the label may be a transcription of the speech.

In FIG. 5, feature extraction component 310, parameterized downsampling component 320, neural network component 330, and parameterized upsampling component 340 may be implemented using any of the techniques described herein. Each of these components includes parameters that may be updated by the training process.

As described above, speech processing component 130 may include any appropriate application that processes a speech signal, such as a speech recognition application. Speech processing component 130 may process the sequence of contextual feature vectors computed by parameterized upsampling component 340 and produce an output. For example, for a speech recognition application, the output may be text corresponding to the speech.

Loss computation component 510 may process the label corresponding to the speech training sample and the output of speech processing component 130 to compute a loss. Any appropriate loss may be computed. For example, for a speech recognition application, the loss may be computed as connectionist temporal classification loss or as a word error rate.

The loss value may then be used as part of a training process as described above for FIG. 4. In some implementations, parameters of the mathematical models of all components may be updated by the training process. In some implementations, parameters of mathematical models of some components (e.g., feature extraction component 310) may be frozen and not updated during training while other components may be updated.

Figure 6:
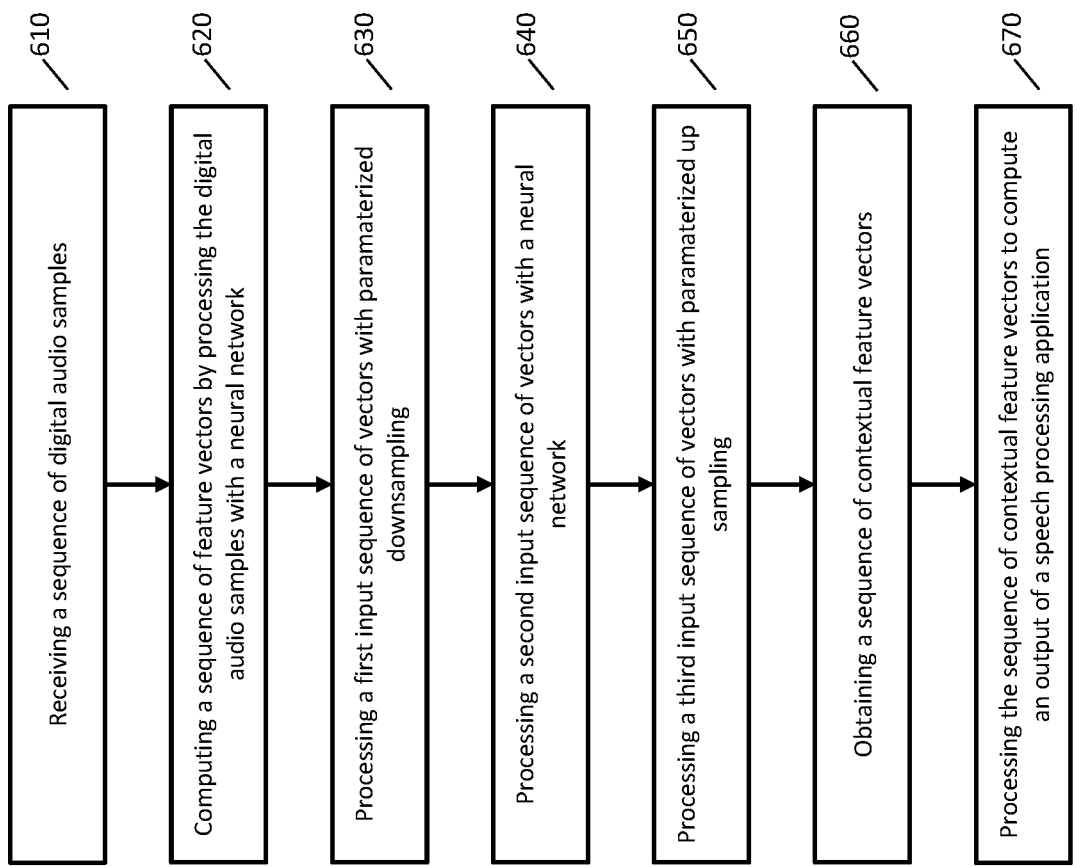
FIG. 6 is a flowchart of an example method for computing feature vectors for a speech processing application.

FIG. 6 is a flowchart of an example method for computing feature vectors for a speech processing application.

At step 610, a sequence of digital audio samples is received. The digital audio may be received using any appropriate techniques. For example, speech may be received at the microphone of a mobile device and digital audio samples may be transmitted using an API call.

At step 620, a sequence of feature vectors is computed by processing the digital audio samples with a neural network. Any appropriate neural network may be used, such as a convolutional neural network or any of the other neural networks described herein.

At step 630, a first input sequence of vectors is processed with parameterized downsampling to compute a first output sequence of vectors. Parameterized downsampling may be implemented using any of the techniques described herein, such as one or more strided convolutional neural network layers. In some implementations, the first input sequence of vectors may be the sequence of feature vectors computed at step 620. In some implementations, other operations may be performed between step 620 and step 630 so that the first input sequence of feature vectors is different from the sequence of feature vectors. The sequence rate of the first output sequence of vectors is less than the sequence rate of the first input sequence of vectors. For example, the sequence rate of the first output sequence of vectors may be one half of the sequence rate of the first input sequence of vectors.

At step 640, a second input sequence of vectors is processed with a neural network to compute a second output sequence of vectors. The neural network may include any of the neural networks described herein, such as a transformer neural network. In some implementations, the second input sequence of vectors may be the first output sequence of vectors computed at step 630. In some implementations, other operations may be performed between step 630 and step 640 so that the second input sequence of feature vectors is different from the first output sequence of vectors.

At step 650, a third input sequence of vectors is processed with parameterized upsampling to compute a third output sequence of vectors. Parameterized upsampling may be implemented using any of the techniques described herein, such as one or more transposed convolutional neural network layers. In some implementations, the third input sequence of vectors may be the second output sequence of vectors computed at step 640. In some implementations, other operations may be performed between step 640 and step 650 so that the third input sequence of feature vectors is different from the second output sequence of vectors. The sequence rate of the third output sequence of vectors is higher than the sequence rate of the third input sequence of vectors. For example, the sequence rate of the third output sequence of vectors may be twice the sequence rate of the third input sequence of vectors. In some implementations, the sequence rate of the third output sequence of vectors may be the same as the sequence rate of the first input sequence of vectors in step 630.

At step 660, a sequence of contextual feature vectors is obtained. In some implementations, the sequence of contextual feature vectors may be the third output sequence of vectors computed at step 650. In some implementations, the sequence of contextual feature vectors may be computed from the third output sequence of feature vectors, such as by using a neural network, performing normalization, or applying a non-linear operation.

At step 670, an output of a speech processing application is computed by processing the sequence of contextual feature vectors. Any appropriate output may be computed, such as any of the speech processing application outputs described herein. In some implementations, the speech processing application may be a speech recognition application and the output may be text corresponding to the speech.

Figure 7:
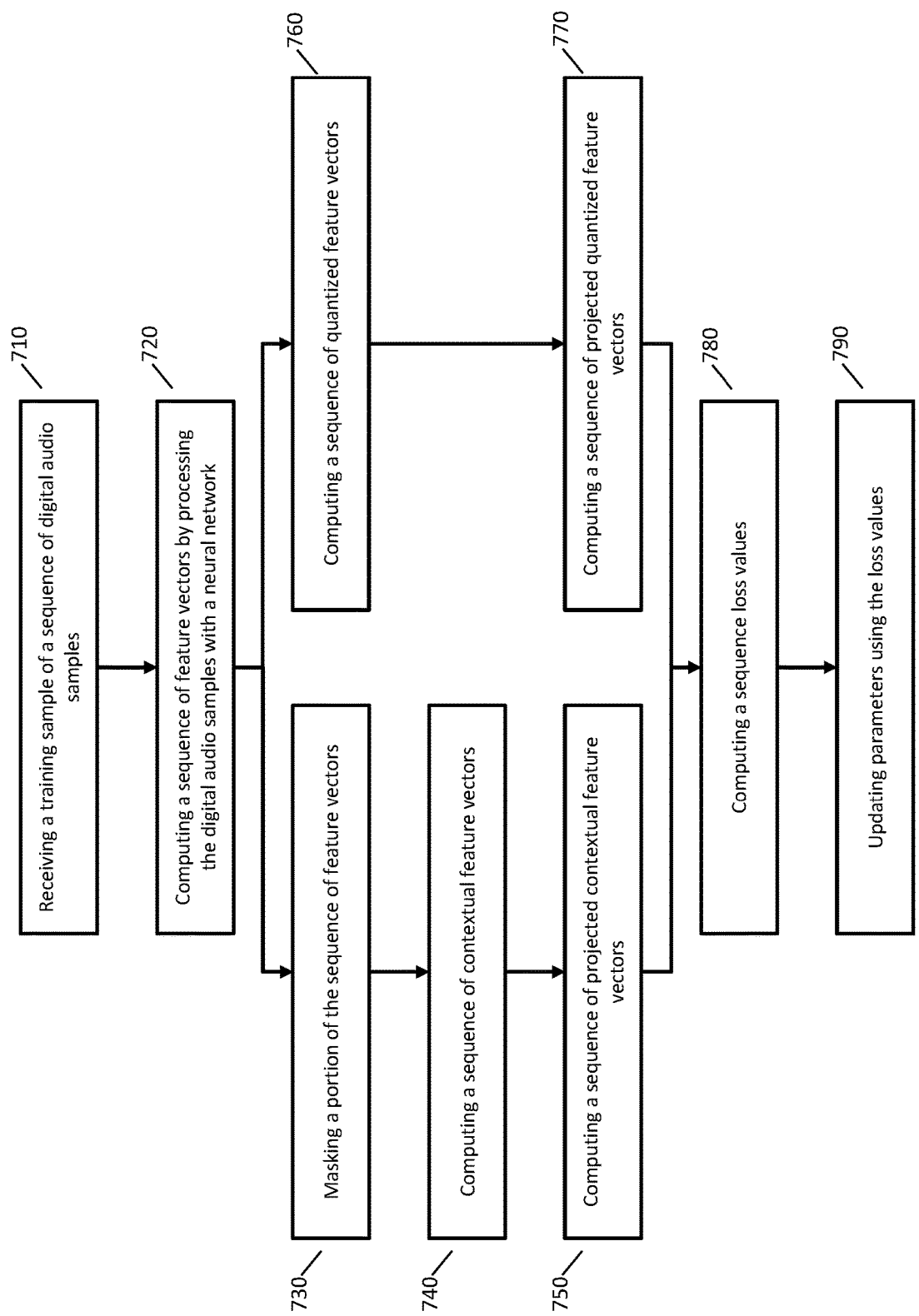
FIG. 7 is a flowchart of an example method for pre-training mathematical models for computing feature vectors for a speech processing application.

FIG. 7 is a flowchart of an example method for pre-training mathematical models for computing feature vectors for a speech processing application.

In FIG. 7, step 710 and step 720 may be implemented using any of the techniques described above for step 610 and step 620 of FIG. 6.

After step 720, the sequence of feature vectors may be processed using two processing techniques.

The first processing technique starts with step 730 where a portion of the sequence of feature vectors is masked to compute a sequence of masked feature vectors. Any appropriate masking techniques may be used, such as any of the masking techniques described herein.

At step 740, a sequence of contextual feature vectors is computed from the sequence of masked feature vectors. The sequence of contextual feature vectors may be computed using any of the techniques described herein. In some implementations, the sequence of contextual feature vectors may be computed by applying the techniques described in steps 630, 640, 650, and 660 of FIG. 6 to the sequence of masked feature vectors.

At step 750, a first sequence of projected feature vectors is computed by applying a projection operation to the sequence of contextual feature vectors. Any appropriate projection operation may be applied that reduces the dimensionality of the contextual feature vectors, such as any of the projection operations described herein.

The second processing technique starts with step 760 where a sequence of quantized feature vectors is computed from the sequence of feature vectors. Any appropriate quantization techniques may be applied, such as any of the quantization techniques described herein.

At step 770, a second sequence of projected feature vectors is computed by applying a projection operation on the sequence of quantized feature vectors. Any appropriate projection operation may be applied that reduces the dimensionality of the quantized feature vectors, such as any of the projection operations described herein.

In some implementations, step 760 may be omitted, and step 770 may instead apply a projection operation to the sequence of feature vectors computed at step 720.

At step 780, one or more loss values are computed by processing the first sequence of projected feature vectors and the second sequence of projected feature vectors. Any appropriate loss value may be computed, such as any of the loss values described herein.

At step 790, parameters are updated using the loss values. Any appropriate techniques may be used to update the parameters, such as performing back propagation using stochastic gradient descent. In some implementations, some parameters remain frozen and are not updated and other parameters are updated. In some implementations, all parameters are updated.

Figure 8:
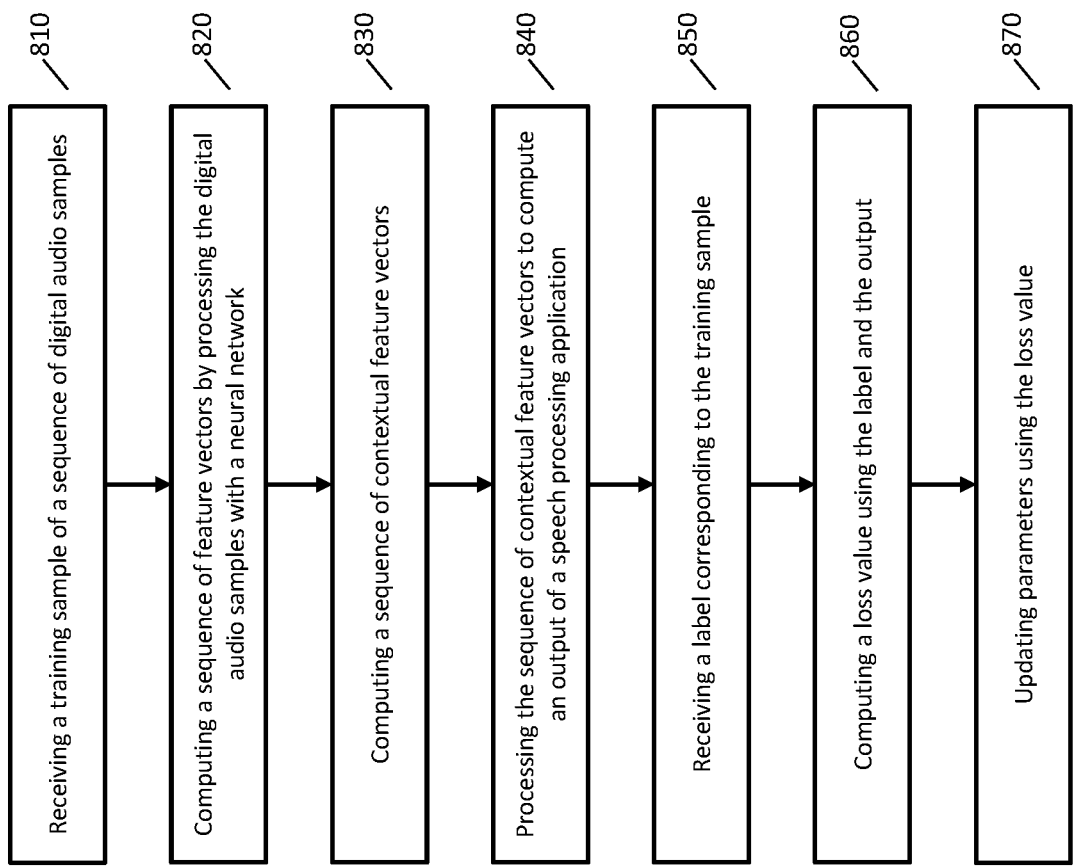
FIG. 8 is a flowchart of an example method for fine tuning mathematical models for computing feature vectors for a speech processing application.

FIG. 8 is a flowchart of an example method for fine tuning mathematical models for computing feature vectors for a speech processing application.

In FIG. 8, step 810 and step 820 may be implemented using any of the techniques described above for step 610 and step 620 of FIG. 6. Step 830 may be implemented using any of the techniques described above for step 740 of FIG. 7. Step 840 may be implemented using any of the techniques described above for step 670 of FIG. 6.

At step 850, a label corresponding to the training sample is received. Any appropriate label may be received and the format of the label may depend on the speech processing application. For example, for a speech recognition application, the label may be a transcript of the speech.

At step 860, one or more loss values are computed using the output computed at step 840 and the label received at step 850. Any appropriate loss value may be computed, and the technique for computing the loss value may depend on the speech processing application. For example, for a speech recognition application, the loss value may be computed as a connectionist temporal classification loss or a word error rate.

At step 870, parameters are updated using the loss values. The parameters may be updated using any appropriate techniques, such as the techniques described above for step 790 of FIG. 7.

Figure 9:
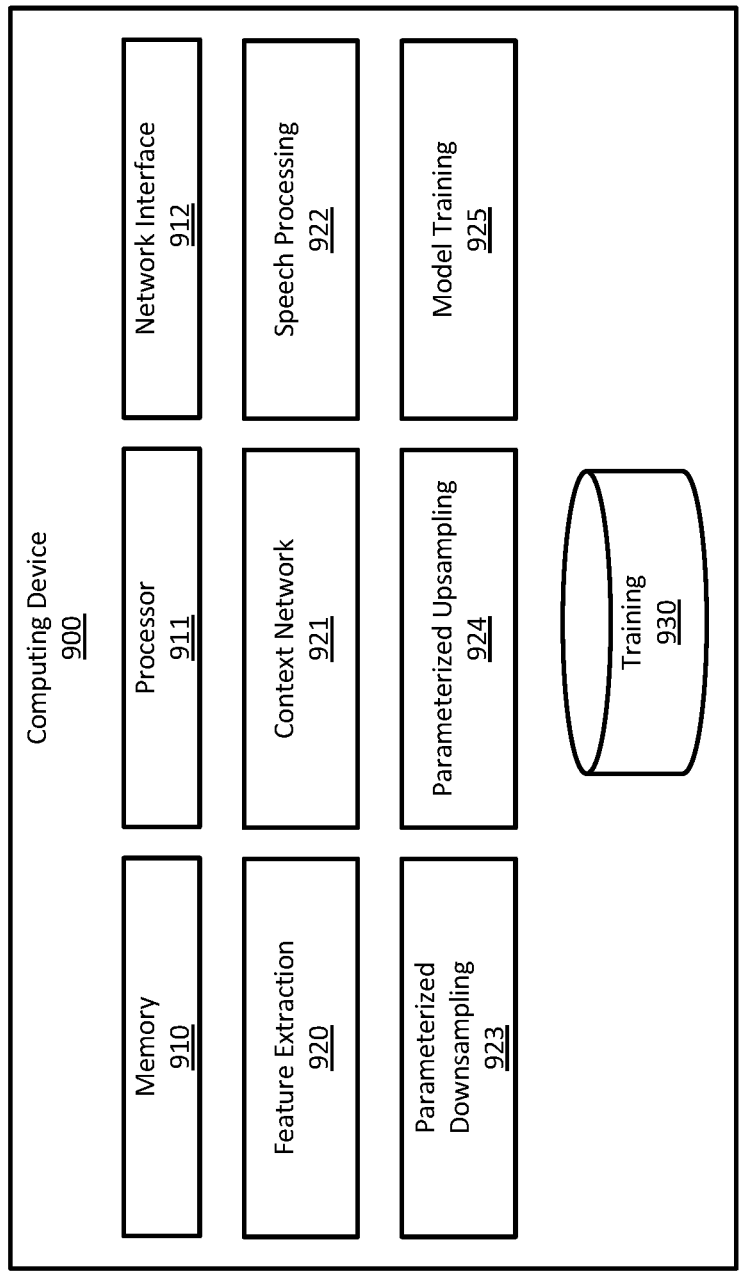
FIG. 9 illustrates components of one implementation of a computing device for computing feature vectors for a speech processing application.

FIG. 9 illustrates components of one implementation of a computing device 900 for implementing any of the techniques described herein. In FIG. 9, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 900 may include any components typical of a computing device, such as volatile or nonvolatile memory 910, one or more processors 911, and one or more network interfaces 912. Computing device 900 may also include any input and output components, such as displays, keyboards, and touch screens. Computing device 900 may also include a variety of components or modules providing specific functionality, and these components or modules may be implemented in software, hardware, or a combination thereof. Computing device 900 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 900 may have a feature extraction component 920 that may compute feature vectors by processing an audio signal using any of the techniques described herein. Computing device 900 may have a context network component 921 that may compute contextual feature vectors from feature vectors using any of the techniques described herein. Computing device 900 may have a speech processing component 922 that may process a sequence of contextual feature vectors to compute an output of a speech processing application using any of the techniques described herein. Computing device 900 may have a parameterized downsampling component 923 that may process and downsample a sequence of vectors using any of the techniques described herein. Computing device 900 may have a parameterized upsampling component 924 that may process and upsample a sequence of vectors using any of the techniques described herein. Computing device 900 may have a model training component 925 that may update mathematical model parameters using a loss value and any of the techniques described herein.

Computing device 900 may include or have access to various data stores. Data stores may use any known storage technology such as files, relational databases, non-relational databases, or any non-transitory computer-readable media. Computing device 900 may have a training data store 930 that stores training data that may be used to train any of the mathematical models described herein.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another.

The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A computer-implemented method, comprising:
   receiving a sequence of digital audio samples;
   computing a sequence of feature vectors by processing the sequence of digital audio samples with a convolutional neural network;
   computing a sequence of contextual feature vectors from the sequence of feature vectors by performing operations comprising:
      processing a first input sequence of vectors with parameterized downsampling by processing the first input sequence of vectors with a strided convolutional neural network layer to compute a first output sequence of vectors, wherein the first input sequence of vectors has a first rate, the first output sequence of vectors has a second rate, and the second rate is less than the first rate,
      processing the first output sequence of vectors with a neural network to compute a second output sequence of vectors, and
      processing the second output sequence of vectors, output by the neural network, with parameterized upsampling, by processing the second output sequence of vectors with a transposed convolutional neural network layer to compute a third output sequence of vectors, wherein the second output sequence of vectors has the second rate and the third output sequence of vectors has the first rate; and
   processing the sequence of contextual feature vectors to compute an output of a speech processing application.

2. The computer-implemented method of claim 1, wherein the first rate is twice the second rate.

3. The computer-implemented method of claim 1, wherein processing the first input sequence of vectors with parameterized downsampling comprises:
   processing the first input sequence of vectors with a strided convolutional neural network layer; and
   processing the first input sequence of vectors with a pooling neural network layer.

4. The computer-implemented method of claim 1, wherein:

processing the first input sequence of vectors with parameterized downsampling comprises processing the first input sequence of vectors with a pooling neural network layer.

5. The computer-implemented method of claim 1, wherein:
processing the second output sequence of vectors with parameterized upsampling comprises processing the second output sequence of vectors with a linear neural network layer.

6. The computer-implemented method of claim 1, wherein processing the first output sequence of vectors with the neural network comprises processing the first output sequence of vectors with a plurality of feed-forward neural network layers and a plurality of self-attention neural network layers.

7. The computer-implemented method of claim 1, wherein processing the first output sequence of vectors with the neural network comprises processing the first output sequence of vectors with a disentangled attention neural network layer.

8. A system, comprising:
at least one server computer comprising at least one processor and at least one memory, the at least one server computer configured to:
receive a sequence of digital audio samples;
compute a sequence of feature vectors by processing the sequence of digital audio samples with a first neural network; and
compute a sequence of contextual feature vectors from the sequence of feature vectors by performing operations comprising:
processing a first input sequence of vectors with parameterized downsampling by processing the first input sequence of vectors with a strided convolutional neural network layer to compute a first output sequence of vectors, wherein a rate of the first output sequence of vectors is less than a rate of the first input sequence of vectors,
processing the first output sequence of vectors with a second neural network to compute a second output sequence of vectors, and
processing the second output sequence of vectors, output by a neural network, with parameterized upsampling, by processing the second output sequence of vectors with a transposed convolutional neural network layer to compute a third output sequence of vectors, wherein a rate of the third output sequence of vectors is larger than a rate of the second output sequence of vectors.

9. The system of claim 8, wherein the at least one server computer is configured to process the sequence of contextual feature vectors to compute an output of a speech processing application.

10. The system of claim 8, wherein the at least one server computer is configured to:
obtain a label corresponding to the sequence of digital audio samples;
compute loss values using the sequence of contextual feature vectors and the label; and
update parameters of the second neural network using the loss values and stochastic gradient descent.

11. The system of claim 8, wherein the at least one server computer is configured to:
mask a portion of the sequence of feature vectors to create a sequence of masked feature vectors, wherein the sequence of contextual feature vectors is computed using the sequence of masked feature vectors;
compute a first sequence of projected feature vectors using the sequence of contextual feature vectors;
compute a second sequence of projected feature vectors using the sequence of feature vectors;
compute loss values using the first sequence of projected feature vectors and the second sequence of projected feature vectors; and
update parameters of the second neural network using the loss values and stochastic gradient descent.

12. The system of claim 11, wherein the at least one server computer is configured to:
compute the first sequence of projected feature vectors using a first multi-layer perceptron; and
compute the second sequence of projected feature vectors using a second multi-layer perceptron.

13. The system of claim 8, wherein the first neural network is a convolutional neural network and comprises a first layer and a second layer, wherein the second layer is subsequent to the first layer and a second number of channels of the second layer is larger than a first number of channels of the first layer.

14. The system of claim 13, wherein a second kernel size of the second layer is smaller than a first kernel size of the first layer.

15. One or more non-transitory, computer-readable media comprising computer-executable instructions that, when executed, cause at least one processor to perform actions comprising:
receiving a sequence of digital audio samples;
computing a sequence of feature vectors by processing the sequence of digital audio samples with a first neural network; and
computing a sequence of contextual feature vectors from the sequence of feature vectors by performing operations comprising:
processing a first input sequence of vectors with parameterized downsampling by processing the first input sequence of vectors with a strided convolutional neural network layer to compute a first output sequence of vectors, wherein a rate of the first output sequence of vectors is less than a rate of the first input sequence of vectors,
processing the first output sequence of vectors with a second neural network to compute a second output sequence of vectors, and
processing the second output sequence of vectors, output by a neural network, with parameterized upsampling, by processing the second output sequence of vectors with a transposed convolutional neural network layer to compute a third output sequence of vectors, wherein a rate of the third output sequence of vectors is larger than a rate of the second output sequence of vectors.

16. The one or more non-transitory, computer-readable media of claim 15, wherein the actions comprise processing the sequence of contextual feature vectors with classifier to compute a sequence of linguistic units.

17. The one or more non-transitory, computer-readable media of claim 16, wherein the sequence of linguistic units comprises at least one of a sequence of graphemes or a sequence of phonemes.

18. The computer-implemented method of claim 1, wherein the first input sequence of vectors is the sequence of feature vectors.

* * * * *